Figure 1:
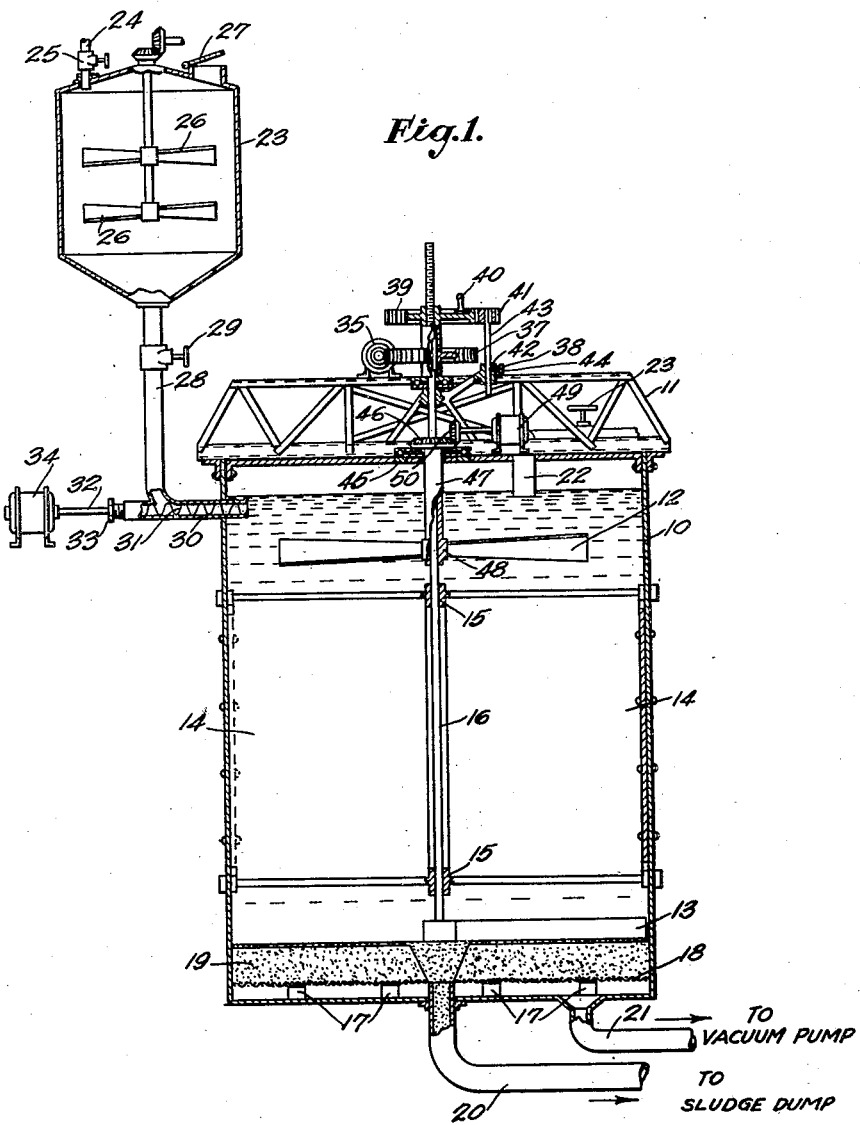

May 1, 1934. C. TIETIG 1,957,303
APPARATUS FOR DECOLORIZING AND FILTERING LIQUIDS
Original Filed April 23, 1930 2 Sheets-Sheet 1

INVENTOR:
Chester Tietig

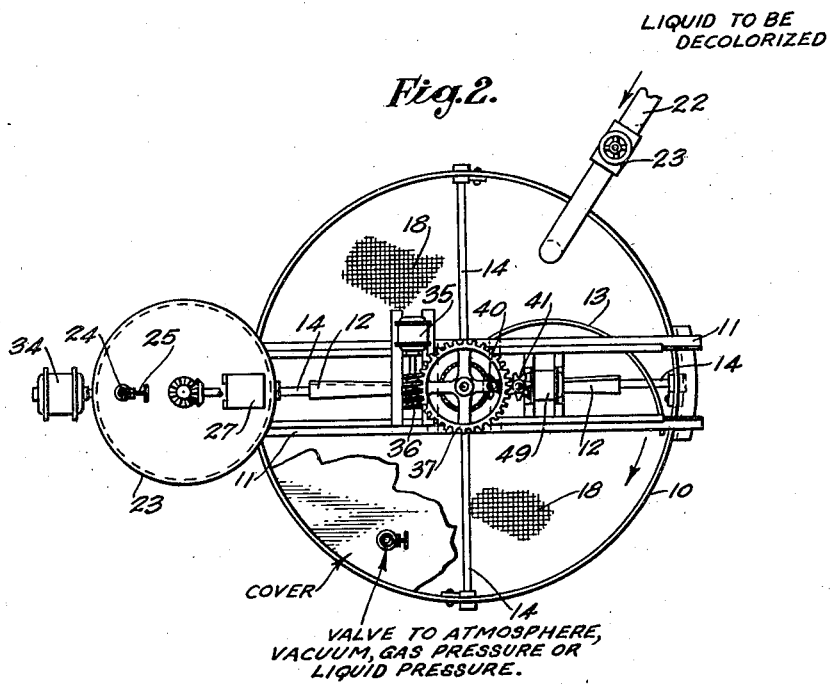

Patented May 1, 1934

1,957,303

UNITED STATES PATENT OFFICE 1,957,303

APPARATUS FOR DECOLORIZING AND FILTERING LIQUIDS

Chester Tietig, Covington, Ky.

Application April 23, 1930, Serial No. 446,617
Renewed December 13, 1933

15 Claims. (Cl. 210—151)

This invention relates to an apparatus for decolorizing and filtering liquids in substantially the same operation. It is intended particularly for use upon oils and sugar solutions, but is adapted to a wide variety of uses in various industries. Not only can decolorization operations be performed, but also the desulphurization of mineral oils and the dosing of various solutions with chemicals whereby a precipitation is caused and the precipitate then removed. An example of such an operation is the dosing of water with chemicals adapted to cause an iron hydroxide precipitate, which is then removed by filtration along with the natural impurities in the water. My apparatus is also adapted to the softening of water in cases where the addition of a softening reagent causes a precipitate.

Heretofore, apparatus of this general nature has been adapted only to remove solids from liquids, and no apparatus, so far as I know, has yet appeared upon the market wherein a decolorization could be carried out by the so-called "contacting" method and the solid matter causing the decolorization removed from the liquid by the same apparatus. No apparatus of this nature has ever, to my knowledge, been made, wherein the filtering surfaces are constantly kept clean and permeable, as they are in mine.

Among other advantages of my apparatus are that it can easily be made in very large capacities and that such large capacities save much additional tankage necessary with the usual forms of apparatus. The usual filter presses and their slow rates of filtration are eliminated. My apparatus is also better adapted to keep its contained liquid at a given temperature thereby eliminating the difficult problems of keeping filter-presses at a constant high heat as is now necessary in removing the decolorizing agent from viscuous lubricating oils.

The apparatus which I illustrate in the accompanying drawings is an improvement upon the machine known commercially as the "Hardinge clarifier", but the principles of my invention may be used also to adapt other apparatus of this class, for instance, thickeners, to operation such as I describe.

In the accompanying drawings, Fig. 1 is an elevational, sectional view of the apparatus.

Fig. 2 is a plan view, the top of tank 10 having been partially removed. 10 indicates a tank preferably having a closed top provided with a valve to the atmosphere and being much deeper than shown in Fig. 1, where lack of space hinders a better showing. The tank may be steam jacketed, if desired. Above 10 and resting upon its edges, is a bridge-like truss 11 which serves to carry the driving and supporting means for high speed agitator or agitators 12 and slow-speed scraper 13.

Within tank 10 and attached to the walls thereof are a pair of baffles 14 which extend entirely across the diameter of the tank, dividing the interior into quadrants. The baffles extend from a point some distance below the lowest agitation 12 to a point just clear of scraper 13. The junction points of the two baffles is a pair of bearings 15 supporting the scraper shaft 16.

Resting upon the bottom of tank 10 is a plurality of blocks 17, upon which rests a screen 18 over which may or may not be spread a cloth (not shown). Over the screen or cloth there is a bed of filtering material 19, which may be fine sand, but which is preferably kieselguhr, preferably the brand made by the Johns-Manville Company known as Hyflo Super-Cel. The depth of this bed will vary from three or four inches to eighteen to twenty inches, depending upon the degree of filtration desired, and the depth will decrease during operation of the apparatus. The scraper 13 touches the top of the filter-bed, and as will later be explained, continuously scrapes a thin layer from its top during operation.

From the bottom of 10 a large centrally located pipe 20 leads to a sludge dump, the pipe being arranged so as to enable a gravity discharge to take place easily. Another large discharge pipe 21, noncentrally located, leads from the bottom of tank 10 to a receiver for liquid, which is held under vacuum by a vacuum pump or ejector (not shown).

Liquid to be decolorized is to be supplied to tank 10 mainly thru a pipe 22 in which there is a regulating means such as a valve 23. An auxiliary supply of oil, or water or both may be furnished to a pre-mixing tank 23 thru a pipe 24 in which there is a valve 25. The tank 23 is provided with a powerful agitator 26, an inlet 27 for powdered decolorizing material (adsorbent), a conical bottom and a large gravity-discharge bottom outlet pipe 28, in which there is a valve 29. The pipe 28 connects at less than a right angle to a horizontal pipe 30 extending a short distance into the tank 10 at a point just below the liquid level therein. Within the pipe 30 there is a rather long, close fitting spiral screw 31 driven by a suitable shaft 32 extending thru a packing gland 33 and driven by suitable means such as electric motor 34 thru any suitable speed reducing device (not shown). The presence of the entire assembly of tank 23 and connected parts is preferred, but it is not necessary since adsorbent powder could be fed directly into the top of tank 10 by a chute (not shown) or by hand if a suitable opening were provided. The auxiliary tank, by furnishing a premixed paste, or mud, makes for economy and smoother feeding of adsorbent.

The means employed for driving the scraper 13 may be those customarily employed upon the Hardinge clarifier. The high-speed agitator or agitators 12 and their associated driving means are not used upon the Hardinge machines, however, and neither are the baffles 14, the adsorbent mixing and feeding mechanism or the closed top.

Upon the truss 11 there is mounted a variable-speed electric motor 35, connected for driving, by means of a worm 36 and engaging worm-wheel 37, the scraper shaft 16 at slow speeds. The hub of worm-wheel 37 rests upon a ball bearing 38, suitably and firmly supported upon the truss 11 against sideward movement, so that the entire weight of the scraper and associated assembly rests upon the top of the hub of worm-wheel 37. It is enabled to so rest from the fact that the top of shaft 16 is threaded, and threadedly engages a combination gear and handwheel 39, the hub of which rests upon the hub of 37. The gear 39 is not intended to rotate except when actuated by hand by means of the hand-grasp 40. It is provided with teeth, however, so that it may be conveniently held by a vertically arranged pinion 41, which is held by any convenient truss member provided with a bushing 42 adapted to receive the pinion shaft 43 and hold it fixedly by means of a set screw 44.

Across the lower truss rails there is securely fastened a large ball or other bearing 45 upon which rests a bevel gear 46. The latter is integral with a sleeve 47 which encircles scraper shaft 16. The sleeve bears upon its lower part, sockets 48 adapted to hold agitation blades. Any convenient number of agitators may be mounted upon the same sleeve. Swirl-breaking devices (not shown) may also be mounted inside of the tank 10 near the tips of the agitator blades. The speed of the agitators, however, is intended to be high; their rotational speed is preferred to be higher than that at which the liquid will swirl. Neighboring pairs of agitators should preferably be canted in opposing directions, so as to produce opposing directions of swirl. The space occupied by the agitators is intended to be the area in which the most of the contacting of the adsorbent with the liquid takes place. It should preferably be relatively deeper than is shown in Fig. 1.

Gear 46 is driven by variable speed motor 49 and bevel pinion 50, consequently driving agitators 12, but in no way affecting the drive of scraper 13. Scraper shaft 16 however, acts as a support against side thrust for sleeve 47 and the shaft is itself stiffened by bearings 15.

In the operation of my apparatus in the decolorization of mineral lubricating oil, the operation is as follows:

The kieselguhr bed 19 is first arranged to a suitable starting depth, say ten inches. The tank 10 is filled with oil at contacting temperature thru pipe 22. Streams of hot oil and dry powdered adsorbent, say fuller's earth or acid-activated clay, are allowed to run continuously into tank 23. Agitator 26 is then operated. Valve 29 is opened after a suitable charge of paste has been prepared. Motor 24 is turned on, operating screw 31 to supply tank 10 with paste. Motors 49 and 35 are turned on in the order named, after which the vacuum pump on the liquid discharge pipe 21 and receiver (not shown) is operated.

The result is that the adsorbent paste coming thru pipe 30 is distributed by agitators 12 thruout the upper mass of oil in tank 10, thereby decolorizing the oil. Gradually the influx of fresh oil and the removal of oil thru pipe 21 will draw the suspension of adsorbent in decolorized oil to a lower position in tank 10; that is, in the quadrants between baffles 14. Here all swirl, of course, is nullified and a condition of quiet prevails. The adsorbent, therefore, has a chance to settle out uniformly over the surface of the filter-bed 19. The operation of the scraper blade 13 is too slow to interfere with this settling.

The scraper 13 drops down a trifle at each revolution, the distance being governed by the pitch of the thread at the top of shaft 16. The lowering effect is produced by the fact that gear 39, upon which shaft 16 hangs, is held rigid while shaft 16 turns. A small depth of the filter bed is therefore gathered at each revolution by clockwise rotation of scraper 13 which is curved, the result being that the scraped matter is moved toward shaft 16 and the entrance to pipe 20 from whence it flows slowly by gravity.

When the scraper has dropped as far as desirable, or possible, the scraper driving and agitator-driving motors are stopped and the combined gear and handwheel 39 loosened by disengaging the set screw 44 and sliding the pinion 41 out of engagement with the gear 39. The latter is then rotated by hand until the scraper blade is lifted to the proper upper level of the filter bed; this bed is then built up, the pinion 41 re-engaged and fastened, and the motors re-started.

It is obvious that in first starting the apparatus, the first oil drawn thru pipe 21 is not decolorized and should be rejected or returned to the top of the tank for decolorization.

With the above description at hand, it will be obvious that fast filtering rates are possible since the surface of bed 19 is kept scraped and comparatively free of fine decolorizing particles. Such particles are notorious contributors to slow filtration rates on account of their extreme fineness.

When extremely rapid filtration is desired, a closed top can be employed over tank 10 and high pressure of air of inert gas can be employed in the empty space over the oil in order to put pressure on the surface of the oil. Or, what is preferable, oil from pipe 22 can be pumped in under hydraulic pressure and the gas space above the oil can be completely filled with liquid, the gas having been vented off thru the cover of tank 10 by a suitable valve located therein. When a closed tank is used under pressure, the vacuum need not necessarily be applied to the oil receiver and to pipe 21, but when both pressure and vacuum effect are used, very rapid filtration results indeed.

The valve in the cover may also conveniently be used to conduct contacting under vacuum. Since vacuum in such case will be applied above and below the oil to be decolorized, the force sending the oil thru the filter bed will be that of the hydrostatic pressure of the oil itself, since the pull of the two vacua will counterbalance each other. For this reason, in such work, the tank 10 should be high, say 25 feet or more.

In ordinary work without pressure upon the oil or vacuum above it, the valve in the cover of the tank should be left open to the atmosphere.

In place of adsorbing material being fed to tank 10, metal oxides such as will combine with the sulphur in the oil may be fed; such metallic oxides can also be mixed with the adsorbent material.

It lies within the scope of my invention to eliminate the lowering mechanism for the scraper blade 13 from my apparatus and merely to allow the scraper blade to turn continuously in the same plane. Any good mechanic could arrange such a change. Only the increment in the depth of the filter bed,—due to deposition of decolorizing material, or other solid matter thereon, would be scraped away, but the filtering efficiency would still remain good. The operating efficiency would very closely approach that of operation with a lowering scraper.

I claim as my invention:

1. In an apparatus of the class described, a tank, agitating means in the top interior of the tank, means for creating a zone of quiet below the agitating means, and a filtering means at the bottom of the tank.

2. In an apparatus of the class described, a tank, agitating means in the top interior of the tank, means for breaking swirl below the agitating means, and a filtering means at the bottom of the tank.

3. In an apparatus of the class described, a tank, agitating means in the top interior of the tank, means for breaking swirl located below the agitating means, a filter bed at the bottom of the tank, an outlet for liquid filtrate, means for continuously scraping the top of the filter bed, and means for ridding the tank of the matter gathered by the said scraping.

4. In an apparatus of the class described, a tank, agitating means in the top interior of the tank, means exterior to the said tank for preparing a paste, means for feeding such paste into the zone affected by the agitators, swirl breaking means in the tank below the agitating means, a filter bed substantially within and at the bottom of the tank, a scraping blade adapted to be continuously rotated on the top surface of the filtering bed, a centrally located bottom outlet pipe adapted for the disposal of the scraped material, and a liquid outlet pipe adapted for the disposal of the filtrate.

5. In combination: a filtering machine having a tank, a filter bed substantially at the bottom of said tank, means in the upper portion of the tank thereof adapted to thoroughly agitate liquid contained in such portion of the tank, and swirl-breaking baffles beneath said agitating means, said swirl-breaking means extending downward until close to the top of the filter bed.

6. An apparatus according to claim 5 having in addition an auxiliary agitating tank, and means for feeding a paste prepared in said tank into the main tank at a point in the zone of thorough agitation therein.

7. An apparatus according to claim 5 having in addition a closed top on the tank and a valve therein.

8. In an apparatus of the class described, a tank, a supporting truss thereover, superposed bearings supported by the truss, a driving gear supported upon one of said bearings, a scraper blade driving shaft extending thru both bearings and the driving gear and adapted to be driven by the latter, a sleeve surmounted by a driving gear surrounding a portion of the scraper blade driving shaft, the sleeve driving gear resting upon one of the said bearings, agitator blades carried upon the lower part of said sleeve, means to drive the agitator blades and associated sleeve by means of the driving gear surmounting the latter, and means to drive the scraper blade driving shaft at a speed slower than that of the sleeve surrounding a portion of said shaft.

9. In an apparatus according to claim 8, a combination gear and handwheel carried by its hub upon the upper truss-supported bearing, said hub being interiorly threaded, the scraper drive shaft passing thru the hub of said combination gear and handwheel and threadedly cooperating therewith and depending therefrom, and disengageable stop means capable of holding said combination gear and handwheel by its peripheral teeth against rotation.

10. An apparatus according to claim 8 having in addition an auxiliary tank adapted to feed a paste into the zone of effect of the agitator blades.

11. An apparatus according to claim 8 having in addition a plurality of substantially vertical baffles below the zone of action of the agitator blades.

12. An apparatus according to claim 8 in which the tank is substantially closed sufficiently to permit the application of a substantial degree of sub-atmospheric or super-atmospheric pressure upon the liquid contents, and open sufficiently to permit the removal of filtrate, semi-solid sludge and the forcing in of adsorbent paste.

13. In an apparatus of the class described, a tank, a filter bed substantially at the bottom of said tank, means for introducing a solid or paste in the upper part of said tank, means for introducing a liquid in the upper part of said tank, means for mingling the liquid and solid or paste in the upper part of said tank, swirl-quieting means below the mixing means, means for removing filtered liquid from the tank and means for removing solid residue of filtration continuously from the tank.

14. An apparatus according to claim 13, having means for putting superatmospheric pressure upon the contents of the tank and means through which to reduce the pressure below the filter bed, of the apparatus to below atmospheric.

15. In an apparatus of the class described, a tank, means for supplying said tank with a liquid at a place near the top thereof, means for supplying said tank with a semi-solid under pressure at a point near the top of the tank, means adapted to move swiftly within the tank and in the upper region thereof for intimately mixing the liquid and the semi-solid, a filter bed substantially at the bottom of said tank and therewithin, said bed comprising a porous filtering layer and a rigid, a foraminous layer, means adapted to move slowly within said tank for continuously removing from the top of the filter bed the solid matter deposited thereupon by filtration, said slowly movable means and said swiftly movable means being concentric with each other and means for introducing a top to bottom passage of the liquid thru the filter bed and so out of the tank, and a separate exit means for the solid matter scraped from the top of the filter bed.

CHESTER TIETIG.